Aug. 8, 1933.  H. R. HANSON  1,921,291

DUMP BODY FOR TRUCKS AND THE LIKE

Filed June 23, 1930

INVENTOR.
HARRY R. HANSON
BY Lincoln V. Johnson
ATTORNEYS.

Patented Aug. 8, 1933

1,921,291

UNITED STATES PATENT OFFICE 1,921,291

DUMP BODY FOR TRUCKS AND THE LIKE

Harry R. Hanson, San Francisco, Calif.

Application June 23, 1930. Serial No. 463,165

1 Claim. (Cl. 298—23)

This invention relates to dump bodies for trucks and the like.

The dump bodies heretofore used usually have gates to cover the rear end of the body, which gates are swingable around the upper edge thereof. In connection with gates of that type it is necessary to provide a manually controlled mechanism to fasten the lower edge of the gate in place so as to prevent the spilling of the content of the dump body. This requires particular care and attention on the part of the driver of such trucks. Furthermore if any large object such as a large rock is to be dumped, the gates used are unable to open sufficiently wide to permit the dumping of such large objects, necessitating the removal of the entire gate, thereby causing a great deal of waste of time and labor.

It is the primary object of this invention to provide a dump body with such a gate arrangement, that the gate is opened and locked or closed automatically as the body is raised or lowered, so that the manual manipulation of the gate is entirely obviated; furthermore, the opening provided by the gate is sufficiently large for the dumping of the average load, and if a large object is to be dumped, then the gate can be readily detached from its automatic operating mechanism and be swung into an out of way position.

Other objects and advantages are to provide a dump body for trucks and the like that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claim following the description, it is desired to cover the invention in whatsoever form it may be embodied.

The invention is clearly illustrated in the accompanying drawing, wherein

Figure 1:
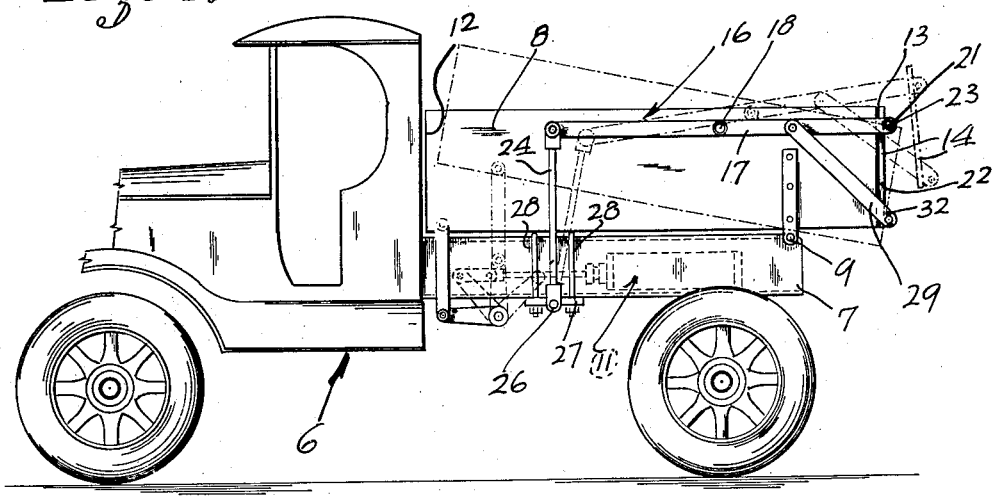
Fig. 1 is a side view of a dump body, the truck being shown somewhat diagrammatically.
Figure 2:
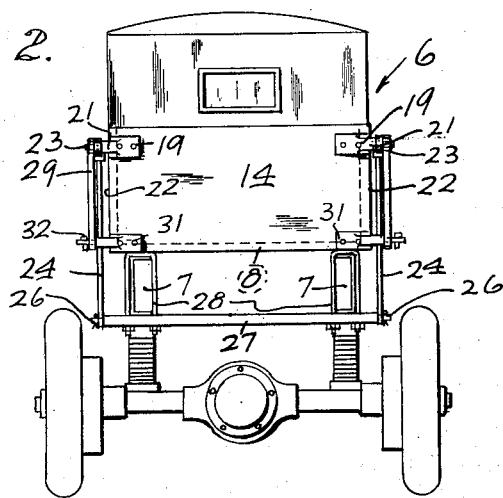
Fig. 2 is a rear end view of the dump truck.
Figures 3, 4:
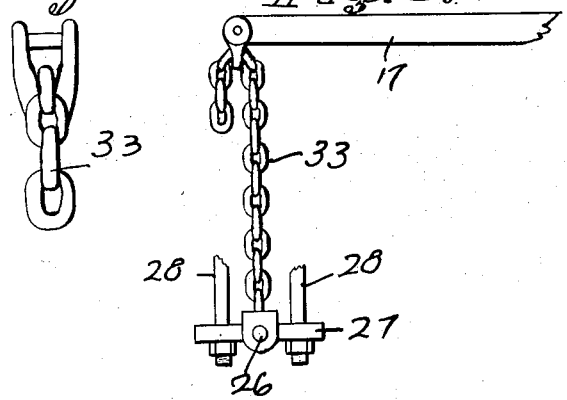
Fig. 3 is a diagrammatic view of the link mechanism with an adjustable chain connection.
Fig. 4 is an end view of the chain mechanism.

In carrying out my invention I make use of a truck 6 on the chassis 7 of which is a dump body 8 used for hauling coal, sand, gravel and the like. The body is mounted on a hinge 9 at the rear end of the chassis 7. A hydraulic hoist or jack, denoted in its entirety by the numeral 11, raises the front end 12 of the body so as to tilt the dump body 8 into an inclined position, indicated in dotted lines in Fig. 1. The hydraulic lifting mechanism or jack 11 usually derives its power from the engine of the truck. The rear end 13 of the body is an open end, thru which the content of the body can be dumped.

In order to automatically uncover and cover the rear end 13 of the body 8, a gate 14 is provided. The gate 14 extends across the entire rear end, and is supported in position by a mechanism designated by the numeral 16, which is in turn supported on the chassis 7, one on each side of said body. Each link mechanism 16 includes a link 17 fulcrumed intermediate its ends. The fulcrum 18 of the link 17 is disposed adjacent the top of the body 8 and on the outside thereof. The rear end of the link 17 is pivotally connected onto a pivot bracket 19 on the gate. The pivot pins 21 of the brackets 19 extend beyond the respective side edges 22 of the gate, adjacent the upper ends of said edges 22. A nut 23 or other suitable fastening means, on each pin 21 prevents the accidental disengagement of the rear ends of the links 17 from the pivot pins 21 and brackets 19.

The front end of each link 17 is pivotally connected to the top of a connecting rod or bar 24, the lower end of the latter being pivoted at 26 on a cross frame member 27. The frame member 27 in turn is mounted on the chassis 7 by means of U-bolts 28. In this manner the mechanisms 16 can be connected to the chassis of a truck without drilling any holes into the chassis, or without otherwise weakening the same.

A connecting link 29 extends diagonally upwardly from the lower end of each side edge 22 of the gate 14. One end of each diagonal link 29 is pivoted on a bracket 31 extending from the gate 14 beyond the respective edge 22. The other end of each link 29 is pivotally secured to the adjacent link 17, at a point intermediate between the fulcrum 18 and the rear end of the said link 17.

It is to be noted that a cross pin 32 extending thru the pin of each bracket 31 prevents the accidental disengagement of the links 29 from the gate 14.

In operation, there is a hydraulic control valve which is opened by the driver so as to cause the operation of the hydraulic jack mechanism 11, thereby to raise the front end 12 of the dump body 8 around its hinge 9. The rear end 13 of said body 8 is lowered below the gate 14, due to the fact that the link mechanism 16 holds the gate 14 against downward movement. In this manner the content of the body 8 is readily dumped thru the clearance space created by the movement of the lower edge of the rear end 13 away from the nearly stationary gate 14.

The dump body 8 in fact pivots around the fulcrum 18 of the link 17, so that primarily it is the rear end 13 of the body 8 that is moved away from the gate 14. Inasmuch as the fulcrum 18 is also moved to a slight extent with the body, the rod 24 is swung rearwardly when the body is raised, by reason of the movement of the link 17; this results in the turning of each link 17 around its fulcrum 18, so that the rear end thereof moves upwardly to a slight extent. Consequently the gate 14 is raised slightly, whereby a still wider clearance space is provided for the dumping of the content of the body 8.

When the dump body 8 is lowered onto the chassis 8, then its rear end 13 moves toward and under the gate 14, and the gate 14 is returned into its closed position. Both the opening and closing of the gate 14 are entirely automatic, and are controlled solely by the raising and lowering of the dump body 8.

In the event a large rock or the like is to be dumped, and the clearance space below the gate 14 is insufficient to allow the dumping thereof, then the cross pins 32 are removed from the lower brackets 31 and the diagonal links 29 can be detached from the gate 14 so as to allow the free outward swinging of the gate. If necessary the rear ends of the links 17 may be also readily detached and the entire gate be removed in a very short time and with a minimum effort.

The gate 14 and its connection to the dump body 8 and to the chassis 7, are so designed that they can be assembled on dump trucks of any and all types, so as to accomplish the automatic opening and closing of the open end of the dump body, as the body is raised and lowered, the assembly of this mechanism does not require the drilling or weakening of the chassis; its operation is entirely automatic; it does not require manual control, or any close attention, therefore it readily lends itself to application for the purposes set forth.

It is to be noted that instead of the rod or bar 24, an adjustable chain 33 connection may be secured between the rear end of the cross frame member 27. In case it is desired to delay the opening of the gate until the body 8 is tilted to a certain angle, it is merely necessary to loosen the chain, so that it does not turn the link 17 until the body 8 is raised far enough to dump the particular load. On the other hand this adjustment also results in a smaller clearance space below the gate when the body 8 is completely raised. Such small adjusted clearance is desirable when the dump truck is used for spreading gravel or the like.

Having thus described this invention, what I claim and desire to secure by Letters Patent is:

In combination with a dump body hinged on a chassis, and means to raise or lower the front end of the body around the hinge to dump its content to the rear of the body; of a gate to cover the rear end of the body; a lever on each side of the body, each lever being pivoted intermediate its ends, the rear end of each lever being attached to the adjacent edges of the gate; a connecting member on each side of the body having one end pivotally connected to the front end of the adjacent lever to hold said end of the lever as the front of the body is raised around the hinge, the length of said connecting member being adjustable to determine the time and the limit of the gate opening relatively to tilting of the dump body, and a diagonal link extending from the lower end of each side of the gate to the respective levers; and means to removably attach the said diagonal link to said gate.

HARRY R. HANSON.